(12) United States Patent
Yang et al.

(10) Patent No.: US 9,112,446 B2
(45) Date of Patent: Aug. 18, 2015

(54) DEVICE, METHOD AND SYSTEM FOR CONTROLLING ROTATION SPEED OF MOTOR

(71) Applicant: DELTA ELECTRONICS (DONGGUAN) CO., LTD., Dongguan (CN)

(72) Inventors: Yongyuan Yang, Dongguan (CN); Yuanhao Liu, Dongguan (CN); Dongming Zhang, Dongguan (CN); Zhijia Wang, Dongguan (CN)

(73) Assignee: Delta Electronics (Dongguan) Co., Ltd., Guangdong (CN)

( * ) Notice: Subject to any disclaimer, the term of this patent is extended or adjusted under 35 U.S.C. 154(b) by 11 days.

(21) Appl. No.: 14/171,520

(22) Filed: Feb. 3, 2014

(65) Prior Publication Data

US 2015/0022136 A1   Jan. 22, 2015

(30) Foreign Application Priority Data

Jul. 16, 2013   (CN) .......................... 2013 1 0301435

(51) Int. Cl.
| | |
|---|---|
| *H02P 1/00* | (2006.01) |
| *H02P 3/00* | (2006.01) |
| *H02P 7/06* | (2006.01) |
| *H02P 31/00* | (2006.01) |

(52) U.S. Cl.
CPC ...................................... *H02P 31/00* (2013.01)

(58) Field of Classification Search
CPC ....................................................... H02P 31/00
USPC ......................................................... 318/504
See application file for complete search history.

(56) References Cited

U.S. PATENT DOCUMENTS

| | | | | |
|---|---|---|---|---|
| 6,469,461 B1* | 10/2002 | Konda et al. | ............. | 318/400.21 |
| 8,674,641 B2* | 3/2014 | Zhang et al. | .................. | 318/471 |
| 2015/0002123 A1* | 1/2015 | Makigawa et al. | ........... | 323/284 |

FOREIGN PATENT DOCUMENTS

| | | |
|---|---|---|
| CN | 100426641 C | 10/2008 |
| TW | I298221 B | 6/2008 |
| TW | 201216025 A | 4/2012 |

* cited by examiner

*Primary Examiner* — Erick Glass
(74) *Attorney, Agent, or Firm* — Yunling Ren; Eaton & Van Winkle (57) ABSTRACT

The present application discloses a device, method and system for controlling a rotation speed of a motor. The device includes: a reference voltage generating module generating a reference voltage; a PWM signal converting module converting a PWM signal into a voltage signal; a first comparator outputting a first level or a second level; a first switching element having a control terminal connected with an output terminal of the first comparator and a first terminal input with a first signal, and being turned on when receiving the second level and being turned off when receiving the first level; a follower having an input terminal connected with the PWM signal converting module; and a control signal outputting terminal outputting the first signal or the voltage signal. The device, method and system are capable of controlling the rotation speed of the motor to jump at a specific duty cycle.

13 Claims, 7 Drawing Sheets

DEVICE, METHOD AND SYSTEM FOR CONTROLLING ROTATION SPEED OF MOTOR

CROSS-REFERENCE TO RELATED APPLICATIONS

This application claims the benefits of Chinese Patent Application No. 201310301435.5 filed on Jul. 16, 2013 in the State Intellectual Property Office of China, the disclosure of which is incorporated herein by reference in its entirety.

TECHNICAL FIELD

The present disclosure relates to technologies for controlling a motor, in particular to a device, a method and a system for controlling a rotation speed of a motor.

BACKGROUND

FIGS. 1 to 4 show four curves relating to motor rotation speed controls, which represent relationships between rotation speeds of motors and signals for controlling the rotation speeds of the motors. The signals may be an electrical signal such as a current signal, a voltage signal, or a Pulse Width Modulation (PWM) signal having a duty cycle. In the four figures, the abscissa represents a duty cycle of a PWM signal for controlling a rotation speed of a motor, and the ordinate represents the rotation speed of the motor.

Figure 1:
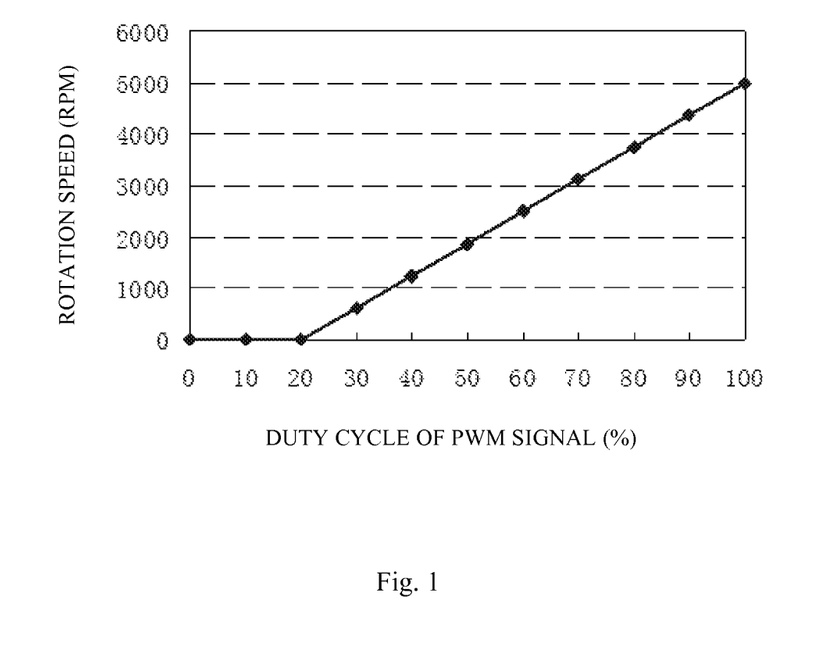
FIGS. 1 to 4 illustratively show four curves relating to motor rotation speed controls.
Figure 2:
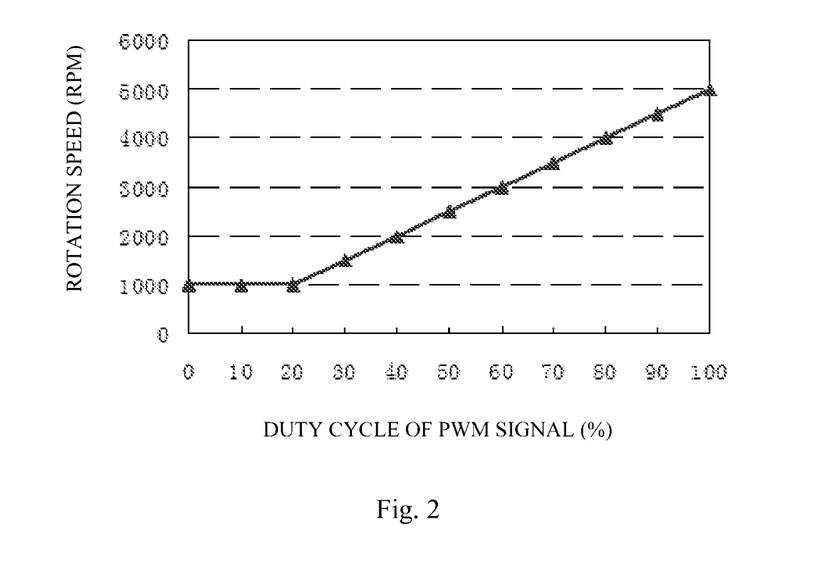
Figure 3:
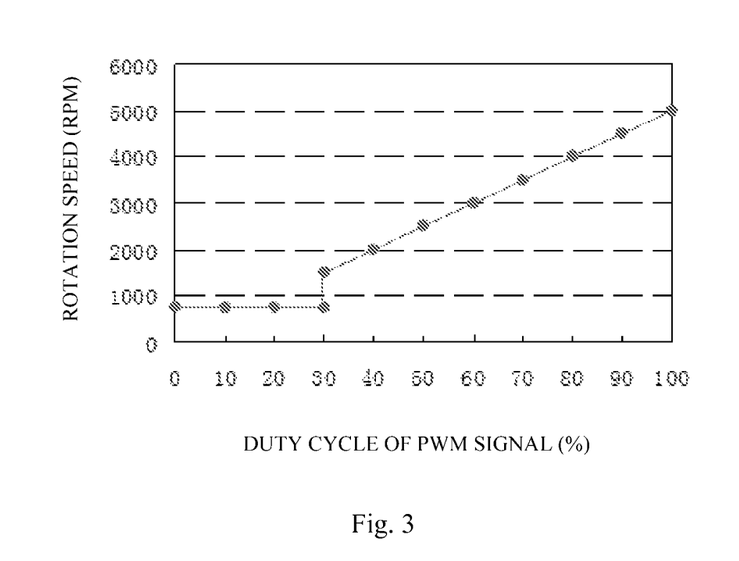
Figure 4:
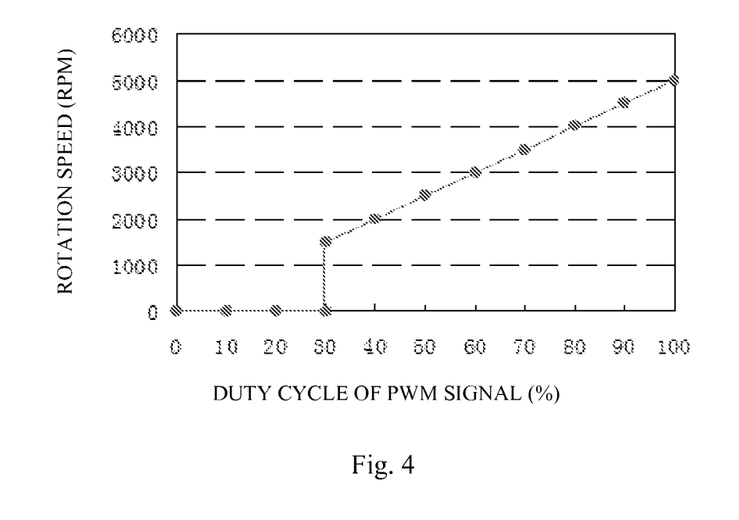

It can be seen from comparisons between FIGS. 1, 2 and FIGS. 3, 4 that: in FIGS. 3 and 4, the rotation speed of the motor can jump to a relatively high rotation speed from a low speed or from a static state at a specific duty cycle; and as shown in FIG. 3, when the duty cycle is about 30%, the motor rotates at about 1600 RPM (Revolutions Per Minute) sharply increased from about 800 RPM; as shown in FIG. 4, when the duty cycle is about 30%, the motor rotates at about 1600 RPM sharply increased from 0 RPM; however, the rotation speeds of the motors in FIGS. 1 and 2 do not have such jumps.

In some application scenarios, the curves relating to motor rotation speed controls shown in FIGS. 3 and 4 are desired. For example, in fans of home appliances and fans of Central Process Units (CPUs), it is desirable that the rotation speed of the motor is capable of jumping at a certain duty cycle.

However, in the related art, only the control curves shown in FIGS. 1 and 2 can be realized and the control curves shown in FIGS. 3 and 4 cannot be realized.

SUMMARY

Aiming at the above problems, the present disclosure provides a device, a method and a system for controlling a rotation speed of a motor, which may make the rotation speed of the motor jump sharply to a relatively high speed from a low speed or a static state at a specific duty cycle, i.e., the control curves shown in FIGS. 3 and 4 may be realized.

The present disclosure provides a device for controlling a rotation speed of a motor, which includes:

a reference voltage generating module configured to generate a reference voltage;

a PWM signal converting module configured to convert a PWM signal into a voltage signal corresponding to a duty cycle of the PWM signal;

a first comparator having a positive terminal connected with the reference voltage generating module and a negative terminal connected with the PWM signal converting module, and configured to output a first level when a voltage of the voltage signal converted from the PWM signal is less than or equal to the reference voltage, and to output a second level when the voltage of the voltage signal converted from the PWM signal is greater than the reference voltage;

a first switching element having a control terminal connected with an output terminal of the first comparator and a first terminal input with a first signal, and configured to be turned on when receiving the second level output from the output terminal of the first comparator so as to enable a connection between a first terminal and a second terminal of the first switching element, and to be turned off when receiving the first level output from the output terminal of the first comparator;

a follower having an input terminal connected with the PWM signal converting module; and a control signal outputting terminal connected with the second terminal of the first switching element and an output terminal of the follower, and configured to provide the first signal received from the second terminal of the first switching element or the voltage signal which is converted from the PWM signal and is received from the follower to a motor control circuit;

wherein when the first switching element is turned on, the motor control circuit is input with the first signal which makes the motor control circuit control the rotation speed of the motor to be zero or a predetermined speed; and when the first switching element is turned off, the motor control circuit is input with the voltage signal converted from the PWM signal to make the rotation speed of the motor be determined by the duty cycle of the PWM signal.

The present disclosure further provides a method for controlling a rotation speed of a motor implemented by the device for controlling the rotation speed of the motor as mentioned previously, which includes:

converting, by the PWM signal converting module, the PWM signal into the voltage signal, and comparing, by the first comparator, the voltage of the voltage signal converted from the PWM signal with the reference voltage;

if the voltage of the voltage signal converted from the PWM signal is greater than the reference voltage, outputting the second level by the first comparator to turn on the first switching element such that a connection between the first terminal and the second terminal of the first switching element is enabled, and sending the first signal received by the first terminal of the first switching element to the motor control circuit to make the motor control circuit control the rotation speed of the motor to be zero or a predetermined speed; and if the voltage of the voltage signal converted from the PWM signal is less than or equal to the reference voltage, outputting the first level by the first comparator to turn off the first switching element, and providing, by the follower, the voltage signal converted by the PWM signal converting module to the motor control circuit to make the rotation speed of the motor to be determined by the duty cycle of the PWM signal.

The present disclosure further provides a system for controlling a rotation speed of a motor, which includes:

a motor;

a motor control circuit connected with the motor and configured to control the rotation speed of the motor;

a device for controlling the rotation speed of the motor connected with the motor control circuit;

wherein the device for controlling the rotation speed of the motor includes:

a reference voltage generating module configured to generate a reference voltage;

a PWM signal converting module configured to convert a PWM signal into a voltage signal corresponding to a duty cycle of the PWM signal;

a first comparator having a positive terminal connected with the reference voltage generating module and a negative terminal connected with the PWM signal converting module, and configured to output a first level when a voltage of the voltage signal converted from the PWM signal is less than or equal to the reference voltage, and to output a second level when the voltage of the voltage signal converted from the PWM signal is greater than the reference voltage;

a first switching element having a control terminal connected with an output terminal of the first comparator, having a first terminal input with a first signal, and configured to be turned on when receiving the second level output from the output terminal of the first comparator so as to enable a connection between a first terminal and a second terminal of the first switching element, and to be turned off when receiving the first level output from the output terminal of the first comparator;

a follower having an input terminal connected with the PWM signal converting module; and a control signal outputting terminal connected with the second terminal of the first switching element and an output terminal of the follower, and configured to provide the first signal received from the second terminal of the first switching element or the voltage signal which is converted from the PWM signal and is received from the follower to the motor control circuit;

wherein when the first switching element is turned on, the motor control circuit is input with the first signal which makes the motor control circuit control the rotation speed of the motor to be zero or a predetermined speed; and when the first switching element is turned off, the motor control circuit is input with the voltage signal converted from the PWM signal to make the rotation speed of the motor be determined by the duty cycle of the PWM signal.

In the embodiments of the present disclosure, it can be seen that, when the voltage of the voltage signal converted from the PWM signal is less than or equal to the reference voltage, i.e., when the duty cycle of the PWM signal is greater than or equal to the duty cycle which the reference voltage corresponds to, the first level output from the first comparator enables the first switching element to be turned off, and thereby the voltage signal converted from the PWM signal is input to the motor control circuit, so that the motor control circuit controls the rotation speed of the motor to change as the duty cycle of the PWM signal changes; when the voltage of the voltage signal converted from the PWM signal is greater than the reference voltage, i.e., when the duty cycle of the PWM signal is less than the duty cycle which the reference voltage corresponds to, the second level output from the first comparator enables the first switching element to be turned on, and thereby the first signal is input to the motor control circuit, so that the motor control circuit controls the rotation speed of the motor to be zero or a predetermined speed (for example, about 800 RPM as shown in FIG. 3). In this way, a jump of the rotation speed of the motor at a predetermined duty cycle is realized.

The above and other objects, features and advantages of the present disclosure will become clearer from the following description of embodiments with reference to drawings.

The foregoing summary is not intended to summarize each potential embodiment or every aspect of the present disclosure.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DESCRIPTION OF THE EMBODIMENTS

Figure 5:
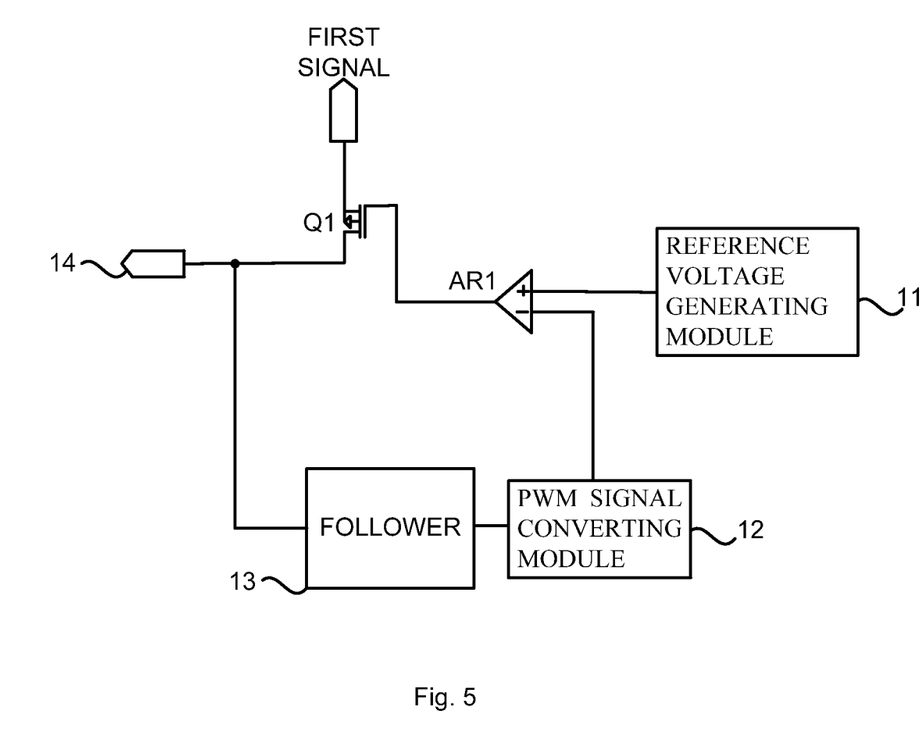
FIG. 5 illustratively shows a schematic diagram of a device for controlling a rotation speed of a motor according to an embodiment of the present disclosure.

FIG. 5 illustratively shows a schematic diagram of a device for controlling a rotation speed of a motor according to one embodiment of the present disclosure. In FIG. 5, a device 1 for controlling the rotation speed of the motor includes a reference voltage generating module 11, a PWM signal converting module 12, a first comparator AR1, a first switching element Q1, a follower 13 and a control signal outputting terminal 14.

The reference voltage generating module 11 is to generate a reference voltage. In the embodiments of the present disclosure, there is no restriction with respect to the reference voltage generating module 11, as long as it is capable of generating a reference voltage. For example, the reference voltage may be generated by a voltage division circuit.

The PWM signal converting module 12 is to convert a PWM signal into a voltage signal. The converted voltage signal corresponds to a duty cycle of the PWM signal, and specifically, the converted voltage signal may be inversely proportional to the duty cycle of the PWM signal. There is no restriction with respect to the specific structure of the PWM signal converting module 12, as long as it is capable of converting a PWM signal into a voltage signal corresponding to a duty cycle of the PWM signal.

A positive terminal of the first comparator AR1 is connected with the reference voltage generating module 11, and a negative terminal of the first comparator AR1 is connected with the PWM signal converting module 12. The first comparator AR1 is to output a first level when a voltage of the voltage signal converted from the PWM signal is less than or equal to the reference voltage, i.e., when the duty cycle of the PWM signal is greater than or equal to the duty cycle which the reference voltage corresponds to (it is assumed that the duty cycle which the reference voltage corresponds to is A %, 0%≤A≤%100%), and to output a second level when the voltage of the voltage signal converted from the PWM signal is greater than the reference voltage, i.e., when the duty cycle of the PWM signal is less than the duty cycle (A %) which the reference voltage corresponds to.

A control terminal of the first switching element Q1 is connected with an output terminal of the first comparator AR1. A first signal is input to a first terminal of the first switching element Q1. The first switching element Q1 is turned on when receiving the second level output from the output terminal of the first comparator AR1 so as to enable a connection between the first terminal and a second terminal of the first switching element Q1, and is turned off when receiving the first level output from the output terminal of the first comparator AR1. The first switching element Q1 may be a Metal Oxide Semiconductor Field Effect Transistor (MOSFET), a Bipolar Junction Transistor (BJT), or the like.

An input terminal of the follower 13 is connected with the PWM signal converting module 12. The follower 13 may realize isolation between an input and an output, i.e., realize isolation between the voltage signal output from the PWM signal converting module 12 and the signal input to the control signal outputting terminal 14.

Figure 7:
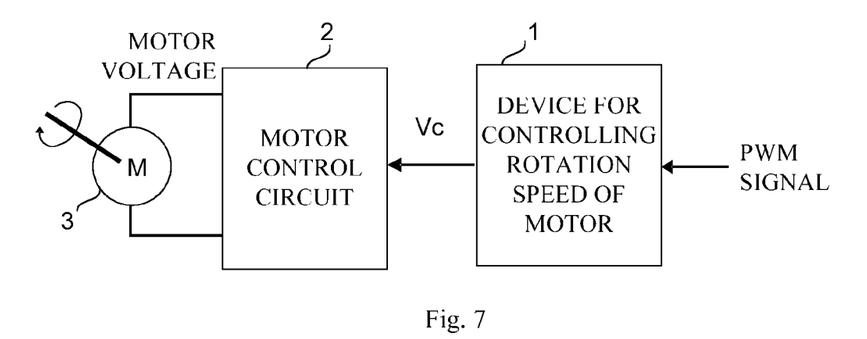
FIG. 7 illustratively shows a schematic diagram of a system for controlling a rotation speed of a motor according to the present disclosure.

The control signal outputting terminal 14 is connected with both the second terminal of the first switching element Q1 and the output terminal of the follower 13, and is to output the first signal received from the second terminal of the first switching element Q1 or the voltage signal which is converted from the PWM signal and is received from the follower 13, into a motor control circuit (see FIG. 7).

The motor control circuit is to generate a signal for controlling a rotation speed of a motor based on the signal received from the control signal outputting terminal 14 so as to control the rotation speed of the motor. Specifically, when the first switching element Q1 is turned on, since the first signal is input to the first terminal of the first switching element Q1, the first signal is input into the motor control circuit. The first signal enables the motor control circuit to control the rotation speed of the motor to be zero or a predetermined speed. When the first switching element Q1 is turned off, the voltage signal converted from the PWM signal is input to the motor control circuit by the follower 13, which enables the motor control circuit to control the rotation speed of the motor to be determined by the duty cycle of the PWM signal. Specifically, the rotation speed of the motor may increase as the duty cycle of the PWM signal increases, i.e., the rotation speed of the motor may increase as the voltage signal converted from the PWM signal decreases.

The motor control circuit may be a driving IC, and a value of the first signal may be determined by actual requirements of the driving IC. For example, if the rotation speed of the motor can be controlled to be zero or a predetermined speed (for example, a low speed) when a high level is input to the driving IC, the first signal may be a high level signal, for example, a power supply voltage (Vcc) signal.

In the embodiments of the present disclosure, the first level and the second level may be set according to the type of the first switching element Q1. For example, if the first switching element Q1 is an N-type MOSEFET, the first level may be a low level which may enable the N-type MOSFET to be turned off and the second level may be a high level which may enable the N-type MOSFET to be turned on. If the first switching element Q1 is a P-type MOSFET, the first level may be a high level which may enable the P-type MOSFET to be turned off and the second level may be a low level which may enable the P-type MOSFET to be turned on.

In the device 1 for controlling the rotation speed of the motor as mentioned above, it can be seen that, when the voltage of the voltage signal converted from the PWM signal is less than or equal to the reference voltage, i.e., when the duty cycle of the PWM signal is greater than or equal to the duty cycle A % which the reference voltage corresponds to, the first level output from the first comparator AR1 enables the first switching element Q1 to be turned off, and thereby the voltage signal converted from the PWM signal is input to the motor control circuit, so that the motor control circuit controls the rotation speed of the motor to change as the duty cycle of the PWM signal changes. When the voltage of the voltage signal converted from the PWM signal is greater than the reference voltage, i.e., when the duty cycle of the PWM signal is less than the duty cycle A % which the reference voltage corresponds to, the second level output from the first comparator AR1 enables the first switching element Q1 to be turned on, and thereby the first signal is input to the motor control circuit, so that the motor control circuit controls the rotation speed of the motor to be zero or a predetermined speed (for example, about 800 RPM as shown in FIG. 3). In this way, a jump of the rotation speed of the motor at a predetermined duty cycle A % is realized.

The curves shown in FIGS. 3 and 4 have three sections: the first section is a section in which the rotation speed is stable, the second section is a section in which the rotation speed changes sharply, and the third section is a section in which the rotation speed changes gently. With the device for controlling the rotation speed of the motor provided by the present disclosure, the three-section rotation speed control curves shown in FIGS. 3 and 4 may be realized, which provides more flexible and diverse control on the rotation speed of the motor.

Figure 6:
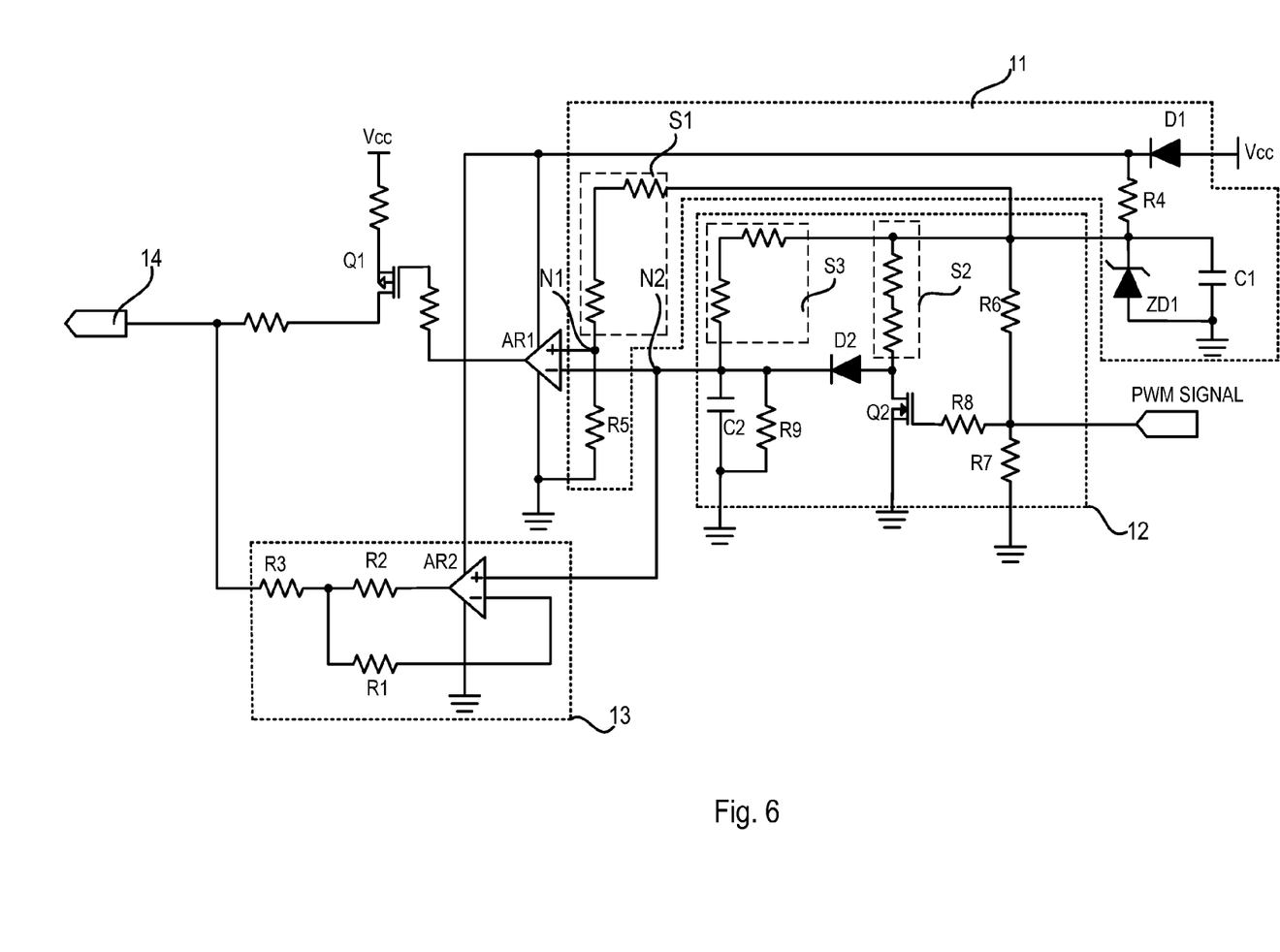
FIG. 6 illustratively shows a schematic diagram of a device for controlling a rotation speed of a motor according to another embodiment of the present disclosure.

FIG. 6 illustratively shows a structure diagram of a device for controlling a rotation speed of a motor according to another embodiment of the present disclosure. This embodiment gives detailed structures of respective modules in the device for controlling the rotation speed of the motor.

In this embodiment, the follower 13 includes a second comparator AR2, a first resistor R1, a second resistor R2 and a third resistor R3.

A positive terminal of the second comparator AR2 is connected with an output terminal of the PWM signal converting module 12. A first terminal of the first resistor R1 is connected with a negative terminal of the second comparator AR2. A first terminal of the second resistor R2 is connected with an output terminal of the second comparator AR2, and a second terminal of the second resistor R2 is connected with a second terminal of the first resistor R1. A first terminal of the third resistor R3 is connected with a second terminal of the second resistor R2, and a second terminal of the third resistor R3 is connected with the control signal outputting terminal 14.

The reference voltage generating module 11 includes a first diode D1, a fourth resistor R4, a voltage stabilizing diode ZD1, a first capacitor C1, a first series resistor string S1 and a fifth resistor R5.

A Vcc signal is input to an anode of the first diode D1. A first terminal of the fourth resistor R4 is connected with a cathode of the first diode. A cathode of the voltage stabilizing diode ZD1 is connected with a second terminal of the fourth resistor R4, and an anode of the voltage stabilizing diode ZD1 is grounded. Two terminals of the first capacitor C1 are respectively connected with the anode and cathode of the voltage stabilizing diode ZD1. A first terminal of the first series resistor string S1 is connected with the cathode of the voltage stabilizing diode ZD1. A first terminal of the fifth resistor R5 is connected with the second terminal of the first series resistor string S1, and a second terminal of the fifth resistor R5 is grounded. A common junction N1 of the second terminal of the first series resistor string S1 and the first terminal of the fifth resistor R5 is connected with the positive terminal of the first comparator AR1.

In this embodiment, the voltage stabilizing diode ZD1 is used to generate the reference voltage, which can ensure that a stable reference voltage may be provided. The stable reference voltage is input to the positive terminal of the first comparator, and thus that the rotation speed of the motor cannot jump at a set duty cycle due to a voltage fluctuation may be avoided, thereby realizing an accurate control.

In FIG. 6, the PWM signal converting module 12 includes a six resistor R6, a seventh resistor R7, an eighth resistor R8, a second switching element Q2, a second diode D2, a second series resistor string S2, a third series resistor string S3, a second capacitor C2 and a ninth resistor R9.

A first terminal of the sixth resistor R6 is connected with a cathode of the voltage stabilizing diode ZD1. A first terminal of the seventh resistor R7 is connected with a second terminal of the sixth resistor R6, and a second terminal of the seventh resistor R7 is grounded. A first terminal of the eighth resistor R8 is connected with the first terminal of the seventh resistor R7 and the second terminal of the sixth resistor R6, and a first terminal of the eighth resistor R8 receives the PWM signal. A control terminal of the second switching element Q2 is connected with a second terminal of the eighth resistor R8, and a second terminal of the second switching element Q2 is grounded. An anode of the second diode D2 is connected with a first terminal of the second switching element Q2. A first terminal of the second series resistor string S2 is connected with the first terminal of the sixth resistor R6, and a second terminal of the second series resistor string S2 is connected with the anode of the second diode D2 and a first terminal of the second switching element Q2. A first terminal of the third series resistor string S3 is connected with the first terminal of the sixth resistor R6, and a second terminal of the third series resistor string S3 is connected with the cathode of the second diode D2. A first terminal of the second capacitor C2 is connected with the second terminal of the third series resistor string S3, and a second terminal of the second capacitor C2 is grounded. A first terminal of the ninth resistor R9 is connected with the cathode of the second diode D2, and a second terminal of the ninth resistor R9 is grounded. A common junction N2 of the second terminal of the third series resistor string S3, the first terminal of the second capacitor C2, the cathode of the second diode D2 and the first terminal of the ninth resistor R9 serves as the output terminal of the PWM signal converting module 12.

It shall be noted that the PWM signal converting module 12, the reference voltage generating module 11 and the follower 13 in the embodiments of the present disclosure are not limited to the structures shown in FIG. 6, and other structures are also applicable.

FIG. 7 illustratively shows a structure diagram of a system for controlling a rotation speed of a motor according to an embodiment of the present disclosure. The system includes a motor 3, a motor control circuit 2 and a device 1 for controlling a rotation speed of a motor. The motor 3 is connected with the motor control circuit 2 which controls the rotation speed of the motor 3. The device 1 for controlling the rotation speed of the motor is connected with the motor control circuit 2, and the motor control circuit 2 controls the rotation speed of the motor 3 based on the signal output from the control signal outputting terminal 14 in the device 1 for controlling the rotation speed of the motor.

Figure 8:
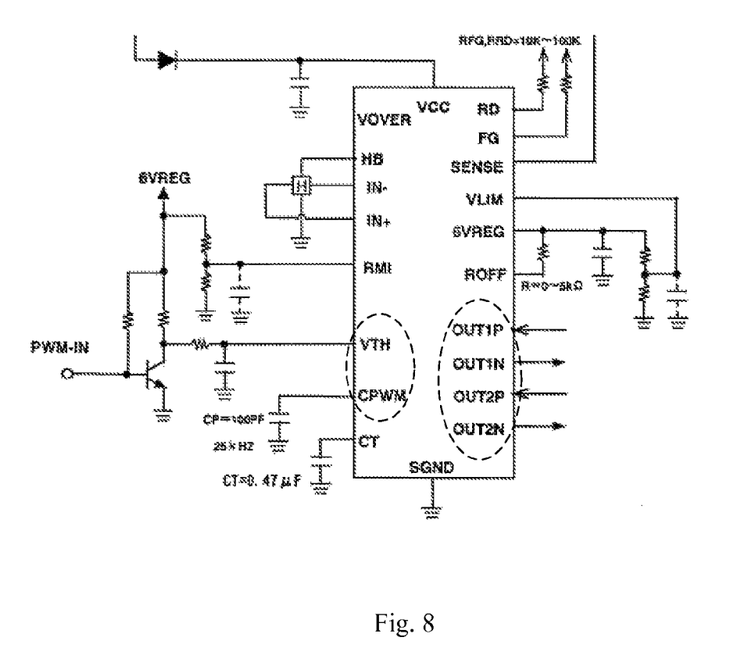
FIG. 8 illustratively shows a partial schematic diagram of a driving IC LB11967.

The motor control circuit 2 may be a driving IC, for example, LB11967. FIG. 8 illustratively shows a partial schematic diagram of LB11967. In this figure, the signal output from the control signal outputting terminal 14 in the device 1 for controlling the rotation speed of the motor is input to a VTH pin (as indicated by an ellipse in this figure), and an OSC signal is input to a CPWM pin (as indicated by the ellipse in this figure). The OSC signal is a voltage signal inside the driving IC and is generally a saw-tooth wave voltage signal obtained by charge and discharge of a capacitor. By comparing this voltage signal with the voltage signal (such as the voltage signal Vc converted from the PWM signal) input at the VTH pin, different motor driving voltage signals may be obtained so as to realize controls on the motor. The motor control signals are the signals at four pins: OUT1P, OUT2P, OUT1N and OUT2N.

Figure 9:
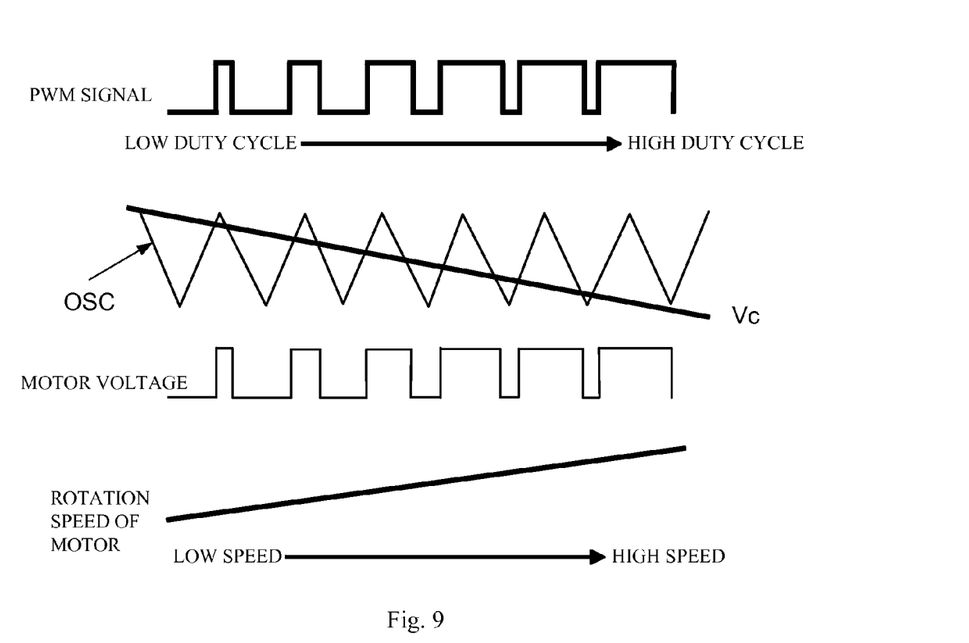
FIG. 9 illustratively shows corresponding relationships among a duty cycle of a PWM signal, a voltage signal Vc converted from the PWM signal by a PWM signal converting module, an OSC signal input from a CPWM pin of the driving IC, a motor voltage and a rotation speed of a motor.

FIG. 9 illustratively shows corresponding relationships among the duty cycle of the PWM signal, the voltage signal Vc converted from the PWM signal by the PWM signal converting module 12, the OSC signal input from the CPWM pin of the driving IC, the motor voltage and the rotation speed of the motor.

The principle of the control on the rotation speed of the motor in the embodiments of the present disclosure will be described below with reference to FIGS. 6-9.

In the embodiment as shown in FIG. 6, the first switching element Q1 is controlled to be turned on and off by the output level of the first comparator AR1, and different control signals may be obtained by turning on and off the first switching element Q1. The control signals are input to the motor control circuit 2, for example, to the VTH pin of LB11967, so as to realize a jump of the rotation speed of the motor 3 at a specific duty cycle A %.

Specifically, referring to FIG. 9, the duty cycle of the PWM signal is inversely proportional to the voltage signal Vc converted by the PWM signal converting module 12, i.e., the voltage signal Vc converted by the PWM signal converting module 12 decreases as the duty cycle of the PWM signal increases.

When the voltage of the voltage signal Vc converted from the PWM signal is greater than the reference voltage, i.e., the duty cycle of the PWM signal is less than the duty cycle A % which the reference voltage corresponds to, the first comparator AR1 outputs a second level (for example, a low level) to make the first switching element Q1 (for example, the first switching element is a P-type MOSFET) be turned on. At this time, the first switching element Q1 provides the Vcc signal to the motor control circuit 2, i.e., provides a high level to the motor control circuit 2. The high level controls the rotation speed of the motor to be zero (see FIG. 3) or a predetermined low speed (for example, about 800 RPM in FIG. 4).

When the voltage of the voltage signal converted from the PWM signal is less than or equal to the reference voltage, i.e., the duty cycle of the PWM signal is greater than or equal to the duty cycle A % which the reference voltage corresponds to, the first comparator AR1 outputs a first level (for example, a high level) to make the first switching element Q1 be turned off. At the same time, the voltage signal Vc, which is converted from the PWM signal and is output from the follower 13, is provided into a control pin of the motor control circuit 2, the motor starts and the rotation speed of the motor is determined by the duty cycle of the PWM signal. Specifically, the rotation speed of the motor may increase as the duty cycle of the PWM signal increases (see FIG. 9).

In this way, when the duty cycle of the PWM signal reaches at A %, the device 1 for controlling the rotation speed of the motor may control the rotation speed of the motor to jump.

In the embodiments of the present disclosure, the follower 13 is employed to provide the voltage signal Vc converted by the PWM signal converting module 12 to the control pin of the driving IC to realize the isolation between an input and an output, thereby eliminating a hysteresis phenomenon.

Figure 10:
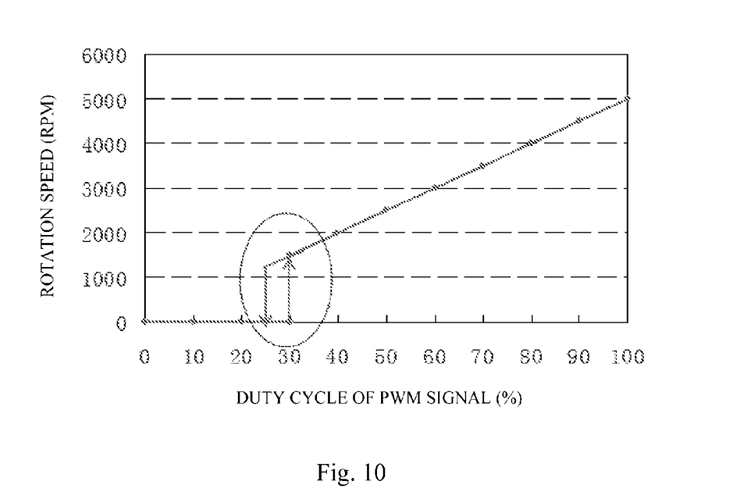
FIG. 10 illustratively shows a curve relating to motor rotation speed control in which a hysteresis phenomenon exists.

The hysteresis phenomenon will be explained below. The so-called "hysteresis" refers to a phenomenon of noncoincidence between a rotation speed control curve when a duty cycle of a PWM signal is upward (i.e., increasing) and a rotation speed control curve when the duty cycle of the PWM signal is downward (i.e., decreasing), especially the noncoincidence in a jumping area (see the portion circled by an ellipse in FIG. 10).

Figure 11:
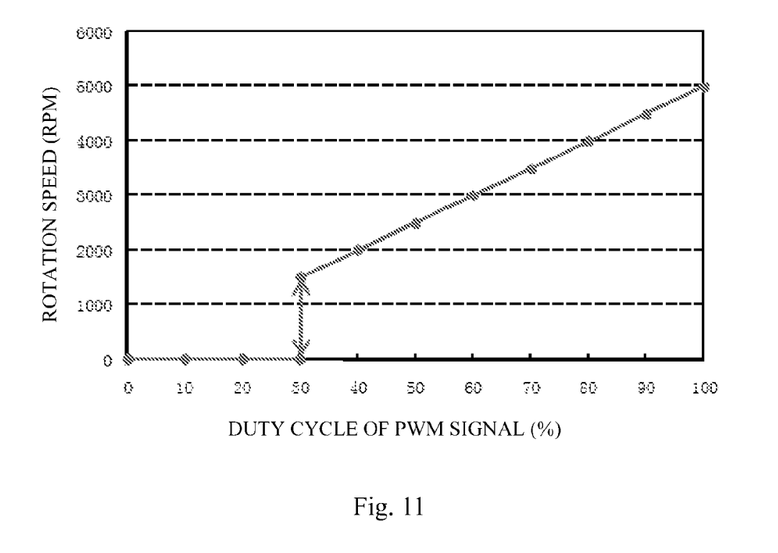
FIG. 11 illustratively shows a curve relating to motor rotation speed control in which the hysteresis phenomenon is eliminated.

The reason why the hysteresis phenomenon occurs is that an input impedance of the driving IC is relatively high, and this relatively high input impedance will be input to the first comparator AR1 and thus the operation of the first comparator AR1 will be influenced, which results in that the first comparator AR1 cannot realize the same output signal switching in both case that the duty cycle of the PWM signal is upward and the duty cycle of the PWM signal is downward. After employing the follower 13 of the present disclosure, due to the isolation function of the follower, the input impedance of the driving IC may be prevented from being input to the first comparator AR1, and thereby the hysteresis phenomenon can be effectively eliminated (see FIG. 11).

Figure 12:
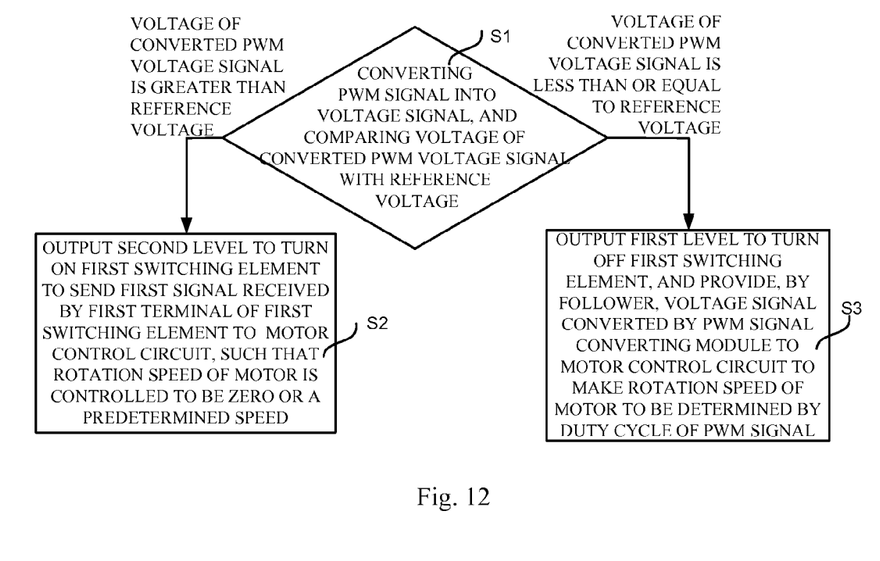
FIG. 12 illustratively shows a flow chart of a method for controlling a rotation speed of a motor according to an embodiment of the present disclosure.

FIG. 12 illustratively shows a flow chart of a method for controlling a rotation speed of a motor according to an embodiment of the present disclosure. The method includes the following steps:

S1. converting a PWM signal into a voltage signal by the PWM converting module, and comparing the voltage of the converted PWM voltage signal with a reference voltage by the first comparator. If the voltage of the voltage signal converted from the PWM signal is greater than the reference voltage, step S2 is performed. If the voltage of the voltage signal converted from the PWM signal is less than or equal to the reference voltage, step S3 is performed.

S2. outputting the second level by the first comparator to turn on the first switching element such that a connection between a first terminal and a second terminal of the first switching element is enabled, and sending the first signal received by the first terminal to the motor control circuit to make the motor control circuit control rotation speed of the motor to be zero or a predetermined speed.

S3. outputting a first level by the first comparator to turn off the first switching element, and providing the voltage signal converted by the PWM signal converting module to the motor control circuit by the follower to make the rotation speed of the motor to be determined by the duty cycle of the PWM signal.

For specific process of the method for controlling the rotation speed of the motor according to embodiments of the present disclosure, the previous description presented with reference to the FIGS. 5-8 may be referred to, and detailed description is omitted.

Although the present application has been described with reference to typical embodiments, it should be understood that the terminologies herein are for illustration purposes rather than to limit the present invention. The present application can be implemented in many specific embodiments without departing from the spirit and scope of the present invention, and thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof

What is claimed is:

1. A device for controlling a rotation speed of a motor, comprising:
   a reference voltage generating module configured to generate a reference voltage;
   a Pulse Width Modulation (PWM) signal converting module configured to convert a PWM signal into a voltage signal corresponding to a duty cycle of the PWM signal;
   a first comparator having a positive terminal connected with the reference voltage generating module and a negative terminal connected with the PWM signal converting module, and configured to output a first level when a voltage of the voltage signal converted from the PWM signal is less than or equal to the reference voltage, and to output a second level when the voltage of the voltage signal converted from the PWM signal is greater than the reference voltage;
   a first switching element having a control terminal connected with an output terminal of the first comparator and a first terminal input with a first signal, and configured to be turned on when receiving the second level output from the output terminal of the first comparator so as to enable a connection between the first terminal and a second terminal of the first switching element, and to be turned off when receiving the first level output from the output terminal of the first comparator;
   a follower having an input terminal connected with the PWM signal converting module; and
   a control signal outputting terminal connected with the second terminal of the first switching element and an output terminal of the follower, and configured to output the first signal received from the second terminal of the first switching element or the voltage signal which is converted from the PWM signal and is received from the follower to a motor control circuit;
   wherein when the first switching element is turned on, the motor control circuit is input with the first signal which makes the motor control circuit control the rotation speed of the motor to be zero or a predetermined speed; and when the first switching element is turned off, the motor control circuit is input with the voltage signal converted from the PWM signal to make the rotation speed of the motor be determined by the duty cycle of the PWM signal.

2. The device according to claim 1, wherein the follower comprises:
   a second comparator having a positive terminal connected with an output terminal of the PWM signal converting module;
   a first resistor having a first terminal connected with a negative terminal of the second comparator;
   a second resistor having a first terminal connected with an output terminal of the second comparator and a second terminal connected with a second terminal of the first resistor; and
   a third resistor having a first terminal connected with the second terminal of the second resistor and a second terminal connected with the control signal outputting terminal.

3. The device according to claim 1, wherein the reference voltage generating module comprises:
   a first diode having an anode input with the first signal;

a fourth resistor having a first terminal connected with a cathode of the first diode;
a voltage stabilizing diode having a cathode connected with a second terminal of the fourth resistor and an anode being grounded;
a first capacitor having two terminals respectively connected with the cathode and the anode of the voltage stabilizing diode;
a first series resistor string having a first terminal connected with the cathode of the voltage stabilizing diode;
a fifth resistor having a first terminal connected with a second terminal of the first series resistor string and a second terminal being grounded;
wherein a common junction of the second terminal of the first series resistor string and the first terminal of the fifth resistor is connected with the positive terminal of the first comparator.

4. The device according to claim 2, wherein the reference voltage generating module comprises:
a first diode having an anode input with the first signal;
a fourth resistor having a first terminal connected with a cathode of the first diode;
a voltage stabilizing diode having a cathode connected with a second terminal of the fourth resistor and an anode being grounded;
a first capacitor having two terminals respectively connected with the cathode and the anode of the voltage stabilizing diode;
a first series resistor string having a first terminal connected with the cathode of the voltage stabilizing diode;
a fifth resistor having a first terminal connected with a second terminal of the first series resistor string and a second terminal being grounded;
wherein a common junction of the second terminal of the first series resistor string and the first terminal of the fifth resistor is connected with the positive terminal of the first comparator.

5. The device according to claim 3, wherein the PWM signal converting module comprises:
a sixth resistor having a first terminal connected with the cathode of the voltage stabilizing diode;
a seventh resistor having a first terminal connected with a second terminal of the sixth resistor and a second terminal being grounded;
an eighth resistor having a first terminal connected with the first terminal of the seventh resistor and the second terminal of the sixth resistor, the first terminal of the eighth resistor being configured to receive the PWM signal;
a second switching element having a control terminal connected with a second terminal of the eighth resistor and a second terminal being grounded;
a second diode having an anode connected with a first terminal of the second switching element;
a second series resistor string having a first terminal connected with the first terminal of the sixth resistor and a second terminal connected with the anode of the second diode and the first terminal of the second switching element;
a third series resistor string having a first terminal connected with the first terminal of the sixth resistor and a second resistor terminal connected with the cathode of the second diode;
a second capacitor having a first terminal connected with the second terminal of the third series resistor string and a second terminal being grounded; and
a ninth resistor having a first terminal connected with a cathode of the second diode and a second terminal being grounded;
wherein a common junction of the second terminal of the third series resistor string, the first terminal of the second capacitor, the cathode of the second diode and the first terminal of the ninth resistor serves as an output terminal of the PWM signal converting module.

6. The device according to claim 4, wherein the PWM signal converting module comprises:
a sixth resistor having a first terminal connected with the cathode of the voltage stabilizing diode;
a seventh resistor having a first terminal connected with a second terminal of the sixth resistor and a second terminal being grounded;
an eighth resistor having a first terminal connected with the first terminal of the seventh resistor and the second terminal of the sixth resistor, the first terminal of the eighth resistor being configured to receive the PWM signal;
a second switching element having a control terminal connected with a second terminal of the eighth resistor and a second terminal being grounded;
a second diode having an anode connected with a first terminal of the second switching element;
a second series resistor string having a first terminal connected with the first terminal of the sixth resistor and a second terminal connected with the anode of the second diode and the first terminal of the second switching element;
a third series resistor string having a first terminal connected with the first terminal of the sixth resistor and a second resistor terminal connected with the cathode of the second diode;
a second capacitor having a first terminal connected with the second terminal of the third series resistor string and a second terminal being grounded; and
a ninth resistor having a first terminal connected with a cathode of the second diode and a second terminal being grounded;
wherein a common junction of the second terminal of the third series resistor string, the first terminal of the second capacitor, the cathode of the second diode and the first terminal of the ninth resistor serves as an output terminal of the PWM signal converting module.

7. A method for controlling a rotation speed of a motor implemented by the device for controlling the rotation speed of the motor of claim 1, comprising:
converting, by the Pulse Width Modulation (PWM) signal converting module, the PWM signal into the voltage signal, and comparing, by the first comparator, the voltage of the voltage signal converted from the PWM signal with the reference voltage;
if the voltage of the voltage signal converted from the PWM signal is greater than the reference voltage, outputting the second level by the first comparator to turn on the first switching element such that a connection between the first terminal and the second terminal of the first switching element is enabled, and sending the first signal received by the first terminal of the first switching element to the motor control circuit to make the motor control circuit control the rotation speed of the motor to be zero or a predetermined speed;
if the voltage of the voltage signal converted from the PWM signal is less than or equal to the reference voltage, outputting the first level by the first comparator to turn off the first switching element, and providing, by the follower, the voltage signal converted by the PWM signal converting module to the motor control circuit to make the rotation speed of the motor to be determined by the duty cycle of the PWM signal.

8. A system for controlling a rotation speed of a motor, comprising:
a motor;
a motor control circuit connected with the motor and configured to control the rotation speed of the motor;
a device for controlling the rotation speed of the motor connected with the motor control circuit;
wherein the device for controlling the rotation speed of the motor comprises:
a reference voltage generating module configured to generate a reference voltage;
a Pulse Width Modulation (PWM) signal converting module configured to convert a PWM signal into a voltage signal corresponding to a duty cycle of the PWM signal;
a first comparator having a positive terminal connected with the reference voltage generating module and a negative terminal connected with the PWM signal converting module, and configured to output a first level when a voltage of the voltage signal converted from the PWM signal is less than or equal to the reference voltage, and to output a second level when the voltage of the voltage signal converted from the PWM signal is greater than the reference voltage;
a first switching element having a control terminal connected with an output terminal of the first comparator and a first terminal input with a first signal, and configured to be turned on when receiving the second level output from the output terminal of the first comparator so as to enable a connection between the first terminal and a second terminal of the first switching element, and to be turned off when receiving the first level output from the output terminal of the first comparator;
a follower having an input terminal connected with the PWM signal converting module; and
a control signal outputting terminal connected with the second terminal of the first switching element and an output terminal of the follower, and configured to output the first signal received from the second terminal of the first switching element or the voltage signal which is converted from the PWM signal and is received from the follower to the motor control circuit;
wherein when the first switching element is turned on, the motor control circuit is input with the first signal which makes the motor control circuit control the rotation speed of the motor to be zero or a predetermined speed; and when the first switching element is turned off, the motor control circuit is input with the voltage signal converted from the PWM signal to make the rotation speed of the motor be determined by the duty cycle of the PWM signal.

9. The system according to claim 8, wherein the follower comprises:
a second comparator having a positive terminal connected with an output terminal of the PWM signal converting module;
a first resistor having a first terminal connected with a negative terminal of the second comparator;
a second resistor having a first terminal connected with an output terminal of the second comparator and a second terminal connected with a second terminal of the first resistor; and a third resistor having a first terminal connected with the second terminal of the second resistor and a second terminal connected with the control signal outputting terminal.

10. The system according to claim 8, wherein the reference voltage generating module comprises:
a first diode having an anode input with the first signal;
a fourth resistor having a first terminal connected with a cathode of the first diode;
a voltage stabilizing diode having a cathode connected with a second terminal of the fourth resistor and an anode being grounded;
a first capacitor having two terminals respectively connected with the cathode and the anode of the voltage stabilizing diode;
a first series resistor string having a first terminal connected with the cathode of the voltage stabilizing diode;
a fifth resistor having a first terminal connected with a second terminal of the first series resistor string and a second terminal being grounded;
wherein a common junction of the second terminal of the first series resistor string and the first terminal of the fifth resistor is connected with the positive terminal of the first comparator.

11. The system according to claim 9, wherein the reference voltage generating module comprises:
a first diode having an anode input with the first signal;
a fourth resistor having a first terminal connected with a cathode of the first diode;
a voltage stabilizing diode having a cathode connected with a second terminal of the fourth resistor and an anode being grounded;
a first capacitor having two terminals respectively connected with the cathode and the anode of the voltage stabilizing diode;
a first series resistor string having a first terminal connected with the cathode of the voltage stabilizing diode;
a fifth resistor having a first terminal connected with a second terminal of the first series resistor string and a second terminal being grounded;
wherein a common junction of the second terminal of the first series resistor string and the first terminal of the fifth resistor is connected with the positive terminal of the first comparator.

12. The system according to claim 10, wherein the PWM signal converting module comprises:
a sixth resistor having a first terminal connected with the cathode of the voltage stabilizing diode;
a seventh resistor having a first terminal connected with a second terminal of the sixth resistor and a second terminal being grounded;
an eighth resistor having a first terminal connected with the first terminal of the seventh resistor and the second terminal of the sixth resistor, the first terminal of the eighth resistor being configured to receive the PWM signal;
a second switching element having a control terminal connected with a second terminal of the eighth resistor and a second terminal being grounded;
a second diode having an anode connected with a first terminal of the second switching element;
a second series resistor string having a first terminal connected with the first terminal of the sixth resistor and a second terminal connected with the anode of the second diode and the first terminal of the second switching element;

a third series resistor string having a first terminal connected with the first terminal of the sixth resistor and a second resistor terminal connected with the cathode of the second diode;

a second capacitor having a first terminal connected with the second terminal of the third series resistor string and a second terminal being grounded; and a ninth resistor having a first terminal connected with a cathode of the second diode and a second terminal being grounded;

wherein a common junction of the second terminal of the third series resistor string, the first terminal of the second capacitor, the cathode of the second diode and the first terminal of the ninth resistor serves as an output terminal of the PWM signal converting module.

13. The system according to claim 11, wherein the PWM signal converting module comprises:

a sixth resistor having a first terminal connected with the cathode of the voltage stabilizing diode;

a seventh resistor having a first terminal connected with a second terminal of the sixth resistor and a second terminal being grounded;

an eighth resistor having a first terminal connected with the first terminal of the seventh resistor and the second terminal of the sixth resistor, the first terminal of the eighth resistor being configured to receive the PWM signal;

a second switching element having a control terminal connected with a second terminal of the eighth resistor and a second terminal being grounded;

a second diode having an anode connected with a first terminal of the second switching element;

a second series resistor string having a first terminal connected with the first terminal of the sixth resistor and a second terminal connected with the anode of the second diode and the first terminal of the second switching element;

a third series resistor string having a first terminal connected with the first terminal of the sixth resistor and a second resistor terminal connected with the cathode of the second diode;

a second capacitor having a first terminal connected with the second terminal of the third series resistor string and a second terminal being grounded; and a ninth resistor having a first terminal connected with a cathode of the second diode and a second terminal being grounded;

wherein a common junction of the second terminal of the third series resistor string, the first terminal of the second capacitor, the cathode of the second diode and the first terminal of the ninth resistor serves as an output terminal of the PWM signal converting module.

\* \* \* \* \*